United States Patent [19]
Aignesberger et al.

[11] 3,856,542
[45] Dec. 24, 1974

[54] PROCESS FOR THE PRODUCTION OF IMPROVED CEMENT

[75] Inventors: Alois Aignesberger; Hans-Gunter Rosenbauer, both of Trostberg, Upper Bavaria, Germany

[73] Assignee: Suddeutsche Kalkstickstoff-Werk Akteingesellschaft, West Germany

[22] Filed: Aug. 13, 1973

[21] Appl. No.: 387,668

[30] Foreign Application Priority Data
Nov. 8, 1972  Germany............................ 2254668

[52] U.S. Cl................... 106/102, 106/90, 106/100, 106/314, 106/315
[51] Int. Cl.............................................. C04b 7/54
[58] Field of Search ............... 106/90, 102, 314, 315

[56] References Cited
UNITED STATES PATENTS
3,767,436  10/1973  Peppler et al...................... 106/314

*Primary Examiner*—J. Poer
*Attorney, Agent, or Firm*—Jerry Cohen; Charles Hieken

[57] ABSTRACT

An aqueous solution of melamine formaldehyde condensation product is sprayed over dry cement product in the fine grinding compartment of a cement grinding mill at a uniform rate essentially throughout the grinding process in concentration and amount chosen to evaporate all the aqueous solvent during the normal cement grinding process and introduce an aggregate of 0.1 to 2.0 weight per cent of condensation product solid in relation to the dry cement product being ground.

4 Claims, No Drawings

3,856,542

PROCESS FOR THE PRODUCTION OF IMPROVED CEMENT

BACKGROUND OF THE INVENTION

The invention relates to the improvement of the properties of cement by addition thereto of melamine formaldehyde condensation products containing sulfonic acid groups.

Austrian Pat. No. 263,607 teaches production of building materials with outstanding physical properties by the addition of amino-s-triazine condensation products modified with sulfite or sulfonic acid to cement mortars or concrete mixtures.

It was also proposed that instead of adding the modified amino-s-triazine condensation product to the mortar mixture in liquid form at the construction site, as is commonly done with similar additives for the improvement of cement properties, the condensation product should rather be mixed in with the cement beforehand in solid form so as to avoid additional work. However, this last-mentioned process is very expensive because such condensation products cannot be added like inorganic additives to the raw metal prior to burning, but rather the solution must be concentrated under careful conditions and dosed separately into the ground cement as a spray-dried powder in a separate mixing device and the dry product must be uniformly distributed.

Thus, three process steps were previously necessary to produce improved cement having improved properties. These consisted of:

1. producing an aqueous solution of the condensation product;
2. spray-drying the aqueous solution of the condensation product;
3. mixing the ground cement with the dried condensation product.

It is therefore an important object of the invention is thus to produce cements with improved properties with least possible apparatus-related expense.

It is a futher object of the invention to provide improved properties to the same degree as the Austrian patent process consistent with the preceding object.

It is a further object of the invention to utilize a liquid condensation product consistent with one or both of the preceding objects.

It is a further object of the invention to achieve intimate mixing of a melamine formaldehyde product with cement consistent with one or more of the preceding objects.

It is a further object of the invention to reduce the time of melamine formaldehyde enhanced cement production consistent with one or more of the preceding objects.

According to the invention, cement is produced by addition of aqueous solution of a melamine formaldehyde condensation product to cement in an amount of 0.1 to 2% with respect to the dry cement substance by spraying it into the fine grinding compartment of the cement grinding mill, preferably at a uniform rate over the cement production time period.

In the procedure according to the invention, the total water content of the condensation product evaporates and its properties remain unaltered. It is believed that this is attributable to the fact that, on one hand, the dwell period of the condensation product in the fine grinding compartment is only brief and, on the other hand however, reaction with the cement components is promoted. It has also been discovered that intermixing during this last stage of the milling process is completely sufficient for the attainment of a uniform product without changing the usual conditions and dwell times in the grinding compartment.

DETAILED DESCRIPTION OF PREFERRED EMBODIMENTS

Other objects, features and advantages of the invention will be apparent from the following detailed description of preferred embodiments.

The melamine formaldehyde condensation product used is preferably one which is produced as described in Austrian Pat. No. 263607 which is incorporated herein by reference as though set out at length herein. The condensation products produced in this manner involve amino-s-triazine condensates modified with sulfite or sulfonic acid. They are produced in principle by condensation of formaldehyde or of a formaldehyde releasing compound such as rongalite in the presence of acid with an amino-s-triazine such as melamine, hexamethylolmelamine, acetoguanamine or benzoguanamine and subsequent transformations with a sulfonation agent such as sulfuric acid, disulfite, dithionite, sulfite, bisulfite, and pyrosulfite in the alkaline range of condensation of an amino-s-triazine sulfonic acid such as acetoguanamine sulfonic acid or benzoguanamine sulfonic acid with formaldehyde or with a formaldehyde releasing compound under acid environment.

Aqueous solutions of the melamine formaldehyde condensation products can be used in a broad range of concentrations. The concentration is appropriately adapted to the temperature in the fine grinding compartment. For example, solutions of low concentration less than 20% are used preferably at temperatures of about 150° C in the compartment, whereas solutions of the condensation products having solid contents of 20% and higher can be used when the temperature in the fine grinding compartment is about 120° C.

Multi-compartment mills suitable for the process according to the invention are described, for example, in Ullmann's Encyklopedia of the Technical Chemistry, Vol. 19, p. 20, 1969.

By means of the process of the invention, two previously necessary operation steps are spared, (1) spray drying of the solution of the condensation product and (2) the mixing of the pulverulent condensation product with the ground cement. The known properties of the building material improved by melamine condensate modified by sulfite or sulfonic acid as described in the Austrain patent, good adhesive strength, tensile strength and compressive strength, surface quality and high wear resistance as well as the use of the condensation product as concrete plasticizer or as additive to adhesive components for ceramics or glass, etc., through the process of the present invention are achieved in equal measure. Accordingly, the process according to the present invention offers a substantial savings in energy, work, apparatus and time. Cements produced according to the invention and in the above cited art find practical use in the entire construction industry, but particularly in usages where value is placed on high-early-strength concrete, such as in the production of prefabricated members or in slipform construction.

The invention is further described by the following non-limiting example.

EXAMPLE

In a two-compartment mill (air-separating mill with coarse and fine compartment; throughput capacity 16 to 18 tons of cement per hour with a specific surface area of the cement of about 4,800 cm$^2$/g measured by Blaine air permeability apparatus used to measure the surface area of a finely ground substance), 50 kg of an aqueous melamine formaldehyde condensation product modified with sulfide or sulfonic acid and having a solids content of 20%, produced according to Austrian Pat. No. 263607, is sprayed into the fine grinding compartment per 1 ton of cement, at a uniform rate over the cement production period. The finished cement contains the calculated quantity of 1% condensation product with respect to total weight of cement and distributed uniformly therein.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Process for the production of improved cement comprising,
   addition of aqueous solution of a melamine formaldehyde condensation product to ground dry cement in an amount of 0.1 to 2 weight per cent of condensation product with respect to the dry cement by spraying the solution into the fine grinding compartment of a cement grinding mill of a cement production plant, and wherein the concentration of the solution of the condensation product as a function of temperature and dwell time of the material in the fine grinding compartment is controlled so that the retention time required for complete evaporation of the water is not substantially exceeded by total grinding time.

2. Cement production process in accordance with claim 1 wherein,
   the melamine formaldehyde is sulfonic acid modified.

3. Cement production process in accordance with claim 1 wherein,
   the melamine formaldehyde is sulfite modified.

4. Cement production process in accordance with claim 1 wherein,
   the solution is sprayed on the cement in the fine grinding section at essentially a uniform rate throughout the cement grinding.

* * * * *

UNITED STATES PATENT OFFICE
CERTIFICATE OF CORRECTION

Patent No. 3,856,542          Dated Dec. 24, 1974

Inventor(s) Alois Aignesberger et al

It is certified that error appears in the above-identified patent and that said Letters Patent are hereby corrected as shown below:

Assignee should read -- Suddeutsche Kalkstickstoff-Werke

Aktiengesellschaft, West Germany

Signed and sealed this 1st day of July 1975.

(SEAL)
Attest:

RUTH C. MASON
Attesting Officer

C. MARSHALL DANN
Commissioner of Patents
and Trademarks